United States Patent [19]

Morhenn et al.

[11] Patent Number: 5,739,262
[45] Date of Patent: Apr. 14, 1998

[54] TERNARY COPOLYAMIDE

[75] Inventors: Heinrich Morhenn, Köln; Dieter Brokmeier, Dormagen; Werner Nielinger, Krefeld, all of Germany

[73] Assignee: Bayer AG, Leverkusen, Germany

[21] Appl. No.: 556,718

[22] Filed: Nov. 13, 1995

[30] Foreign Application Priority Data

Nov. 25, 1994 [DE] Germany ............... 44 41 981.3

[51] Int. Cl.$^6$ ............... C08G 69/08; C08G 73/10
[52] U.S. Cl. ............... 528/310; 528/322; 528/323; 528/324; 528/326; 528/331; 528/332; 528/336; 528/338; 528/339; 525/432
[58] Field of Search ............... 528/310, 322, 528/324, 323, 326, 336, 331, 332, 338, 339; 428/364, 395; 525/432

[56] References Cited

U.S. PATENT DOCUMENTS

| | | | |
|---|---|---|---|
| 3,883,487 | 5/1975 | Raabe et al. | 528/324 |
| 3,948,844 | 4/1976 | Raabe et al. | 528/324 |
| 4,093,492 | 6/1978 | Raabe et al. | 528/324 |
| 4,225,699 | 9/1980 | Schmid et al. | 528/324 |
| 4,277,433 | 7/1981 | Schmid et al. | 528/324 |
| 4,837,297 | 6/1989 | Meyer et al. | 528/323 |
| 5,344,708 | 9/1994 | Windley | 528/310 |
| 5,478,624 | 12/1995 | Lofquist | 428/97 |

FOREIGN PATENT DOCUMENTS

| | | |
|---|---|---|
| 1 576 946 | 8/1969 | France . |
| 2 228 806 | 12/1974 | France . |
| 28 00 744 | 7/1978 | Germany . |
| 1 329 697 | 9/1973 | United Kingdom . |

OTHER PUBLICATIONS

Orbit Abstract of DE 28 00 744 (Jul. 13, 1978).

*Primary Examiner*—P. Hampton-Hightower

[57] ABSTRACT

This invention relates to a novel ternary polyamide for the production of monofilaments, films and injection moulded articles.

11 Claims, No Drawings

TERNARY COPOLYAMIDE

BACKGROUND OF THE INVENTION

Field of the Invention

Ternary copolyamide

This invention relates to a novel ternary polyamide for the production of monofilaments, films and injection moulded articles.

Ternary copolyamides are known (for example DE-A 2 800 744).

SUMMARY OF THE INVENTION

The present invention provides ternary polyamides produced from a) 75 to 85 wt. % caprolactam b) 4 to 20 wt. % aminoundecanoic acid and/or aminododecanoic acid and c) 4 to 20 wt. % hexamethylenediamine adipate (AH salt) such that, after deduction of the water of reaction, the sum of the components in the polymer is in each case 100%.

The terpolyamides according to the invention are produced in a similar manner to known processes. Production may proceed continuously or discontinuously. All the components may, for example, be introduced at one time. The components are randomly incorporated into the polymer.

In comparison with copolyamides (polyamides made from caprolactam and one other component) having the same caprolactam content, i.e. copolyamides prepared from 75 to 85% caprolactam and 15 to 25% 11-aminoundecanoic acid or 12-aminododecanoic acid or copolyamides prepared from 75 to 85% caprolactam and 15 to 25% AH salt, the ternary polyamides according to the invention are distinguished by greater softness, a lesser tendency to crystallise, a lower melting point and cost advantages.

The greater softness and the reduced tendency to crystallise are in particular evident in comparison with copolyamides prepared from 75 to 85% caprolactam and 15 to 25% AH salt. Cost advantages are also achieved in comparison with copolyamides prepared from 75 to 85% caprolactam and 15 to 25% 11-aminoundecanoic acid or 12-aminododecanoic acid due to the readier availability of AH salt in comparison with 11-aminoundecanoic acid or 12-aminododecanoic acid.

The ternary polyamides described in DE-A 2 800 744 have an average amide frequency of 1 CONH to 6.4–7.4 $CH_2$. With an average amide frequency of 4.6 to 5.7; the terpolyamides according to the invention are of a fundamentally different composition.

It has been found that the terpolyamides according to the invention, unlike those described in DE-A 2 800 744, have elevated resistance to water and also a low tendency to adhere, such that they may readily be spun into monofilaments and stretched. They may furthermore be processed into moulded articles, films, fibres etc..

DESCRIPTION OF THE PREFERRED EMBODIMENTS

EXAMPLES

Example 1

A terpolyamide of the composition 80% caprolactam, 5% aminododecanoic acid and 15% AH salt was produced by continuous polymerisation. The rate of incorporation and distribution of the monomers may be ascertained by $^{13}C$ NMR.

The polymer has a relative viscosity of 2.95 (measured in m-cresol). Differential thermal analysis reveals a melting point of 191° C. (2nd heating peak) and crystallisation enthalpy is 39.8 J/g on cooling from 150° C.

Example 2

A terpolyamide of the composition 80% caprolactam, 15% aminoundecanoic acid and 5% AH salt was produced by continuous polymerisation. The rate of incorporation and distribution of the monomers may be ascertained by $^{13}C$ NMR.

The polymer has a relative viscosity of 2.95 (measured in m-cresol). Differential thermal analysis reveals a melting point of 193° C. (2nd heating peak) and crystallisation enthalpy is 26.4 J/g on cooling from 150° C.

In contrast, differential thermal analysis of a copolyamide produced in the same manner from 80% caprolactam and 20% aminoundecanoic acid having a relative viscosity of 2.95 (measured in m-cresol exhibits a melting point of 198° C. and crystallisation enthalpy is 29.6 J/g on cooling from 150° C.

Example 3

A terpolymer according to example 1 was processed on conventional monofilament plant to monofilaments of a diameter of 2.00 mm.

The monofilaments had the following properties:

| Linear strength | (cN/tex) | 48 |
|---|---|---|
| Breaking elongation | (%) | 26 |
| Knot strength | (cN/tex) | 31 |
| Flexural rigidity | (N/mm$^2$) | 60 |
| Shrinkage on boiling | (%) | 15 |

Example 4

A terpolymer according to example [2] was processed on conventional monofilament plant to monofilaments of a diameter of 2.00 mm.

The monofilaments had the following properties:

| Linear strength | (cN/tex) | 47 |
|---|---|---|
| Breaking elongation | (%) | 30.5 |
| Knot strength | (cN/tex) | 36 |
| Flexural rigidity | (N/mm$^2$) | 38 |
| Shrinkage on boiling | (%) | 17 |

Example 5

A copolymer of the composition 80% caprolactam and 20% aminoundecanoic acid having a relative viscosity of 2.95 (measured in m-cresol) was processed on conventional monofilament plant to monofilaments of a diameter of 2.00 mm. The monofilaments had the following properties:

| Linear strength | (cN/tex) | 46 |
|---|---|---|
| Breaking elongation | (%) | 28 |
| Knot strength | (cN/tex) | 27 |
| Flexural rigidity | (N/mm$^2$) | 33 |
| Shrinkage on boiling | (%) | 14 |

Example 6

A conventional commercial copolymer of the composition 80% caprolactam and 15% AH salt (Ultramid C35 from BASF) having a relative viscosity of 3.50 (measured in m-cresol) was processed on conventional monofilament plant to monofilaments of a diameter of 2.00 mm.

The monofilaments had the following properties:

| | | |
|---|---|---|
| Linear strength | (cN/tex) | 45 |
| Breaking elongation | (%) | 22 |
| Knot strength | (cN/tex) | 23 |
| Flexural rigidity | (N/mm$^2$) | 85 |
| Shrinkage on boiling | (%) | 16 |

What is claimed is:

1. Ternary copolyamides prepared from
   a) 75 to 85% by weight caprolactam;
   b) 4 to 20% by weight aminoundecanoic acid and/or aminododecanoic acid; and
   c) 4 to 20% by weight hexamethylenediamine adipate (AH salt).

2. A method of using the ternary copolyamides according to claim 1, wherein the copolyamides are moulded into articles, films, fibres or monofilaments.

3. Moulded articles, films, fibres and monofilaments, prepared from ternary copolyamides according to claim 1.

4. Ternary copolyamides prepared from
   a) 75 to 85% by weight caprolactam;
   b) 5 to 15% by weight aminoundecanoic acid and/or aminododecanoic acid; and
   c) 5 to 15% by weight hexamethylenediamine adipate (AH salt).

5. Ternary copolyamides according to claim 4, wherein the amount of said caprolactam used is about 80% by weight, the amount of said aminoundecanoic acid and/or aminododecanoic acid used is about 5% by weight and the amount of said hexamethylenediamine adipate used is about 15% by weight.

6. Ternary copolyamides according to claim 4, wherein the amount of said caprolactam used is about 80% by weight, the amount of said aminoundecanoic acid and/or aminododecanoic acid used is about 15% by weight and the amount of said hexamethylenediamine adipate used is about 5% by weight.

7. Ternary copolyamides according to claim 5, wherein the aminoundecanoic acid and/or aminododecanoic acid used is aminododecanoic acid.

8. Ternary copolyamides according to claim 6, wherein the aminoundecanoic acid and/or aminododecanoic acid used is aminoundecanoic acid.

9. Ternary copolyamides according to claim 1, wherein the ternary copolyamides have an average amide frequency of 1 CONH to 4.6 to 5.7 $CH_2$.

10. Ternary copolyamides according to claim 4, wherein the ternary copolyamides have an average amide frequency of 1 CONH to 4.6 to 5.7 $CH_2$.

11. Ternary copolyamides consisting of:
    a) 75 to 85% by weight caprolactam units;
    b) 4 to 20% by weight aminoundecanoic acid and/or aminododecanoic acid units; and
    c) 4 to 20% by weight hexamethylenediamine adipate (AH salt) units.

* * * * *